No. 768,750. PATENTED AUG. 30, 1904.
W. S. HUSON.
MECHANICAL MOVEMENT.
APPLICATION FILED OCT. 1, 1897. RENEWED DEC. 28, 1903.
NO MODEL. 2 SHEETS—SHEET 1.

Witnesses.
W. J. Baldwin
E. M. Healy.

Inventor.
W. S. Huson.
By
Southgate & Southgate
Attorneys

No. 768,750. Patented August 30, 1904.

UNITED STATES PATENT OFFICE.

WINFIELD S. HUSON, OF PLAINFIELD, NEW JERSEY, ASSIGNOR TO THE CAMPBELL PRINTING PRESS & MANUFACTURING COMPANY, OF NEW YORK, N. Y., A CORPORATION OF NEW YORK.

MECHANICAL MOVEMENT.

SPECIFICATION forming part of Letters Patent No. 768,750, dated August 30, 1904.

Application filed October 1, 1897. Renewed December 28, 1903. Serial No. 186,925. (No model.)

*To all whom it may concern:*

Be it known that I, WINFIELD S. HUSON, a citizen of the United States, residing at Plainfield, in the county of Union and State of New Jersey, have invented a new and useful Improvement in Mechanical Movements, of which the following is a specification.

The aim of this invention is to provide a new and improved mechanical movement for converting rotary motion into rectilinearly-reciprocating motion.

The movement has been especially designed as an actuating mechanism for the moving beds of printing-presses, but may be applied to other uses.

Figure 1:
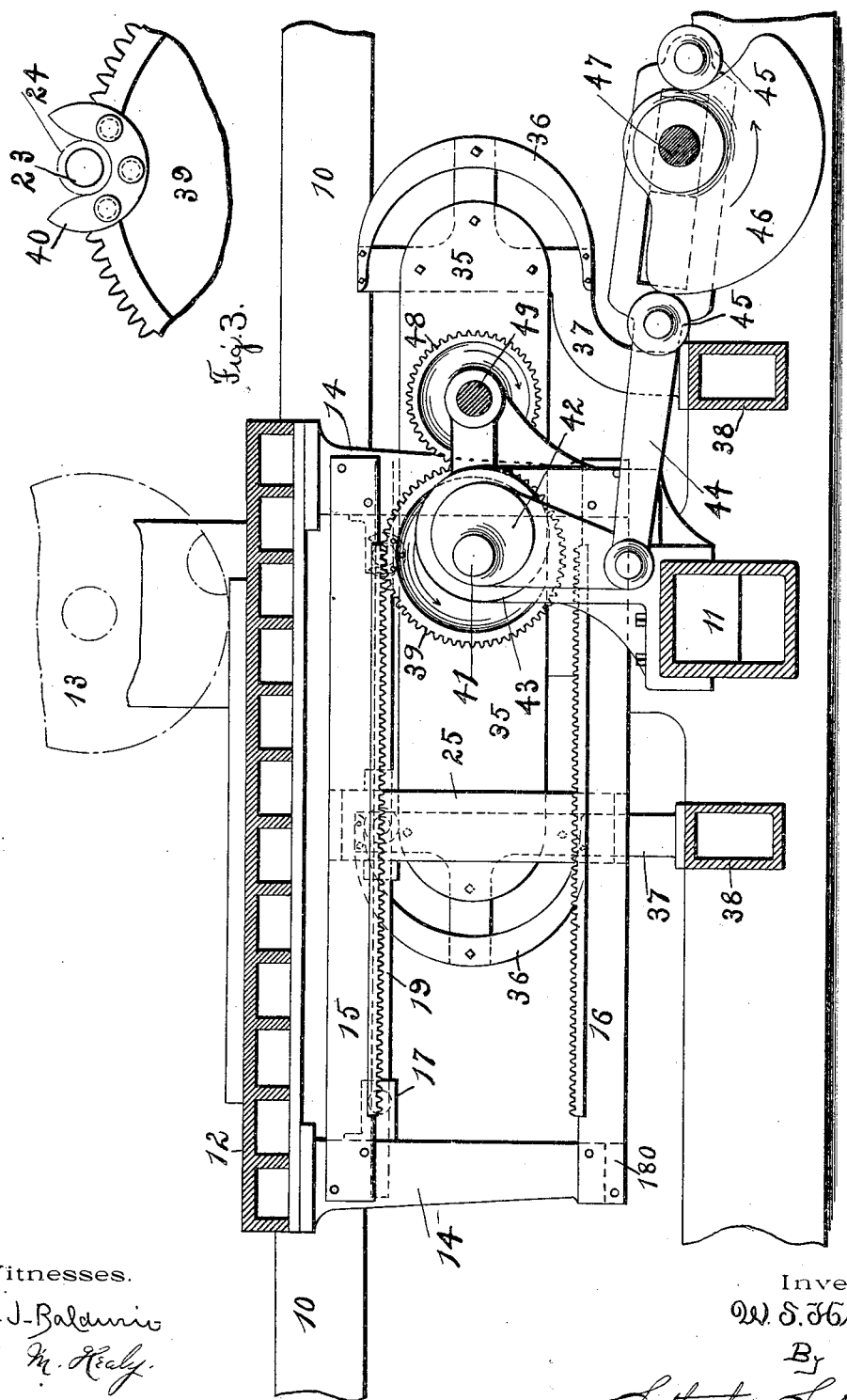
Figure 2:
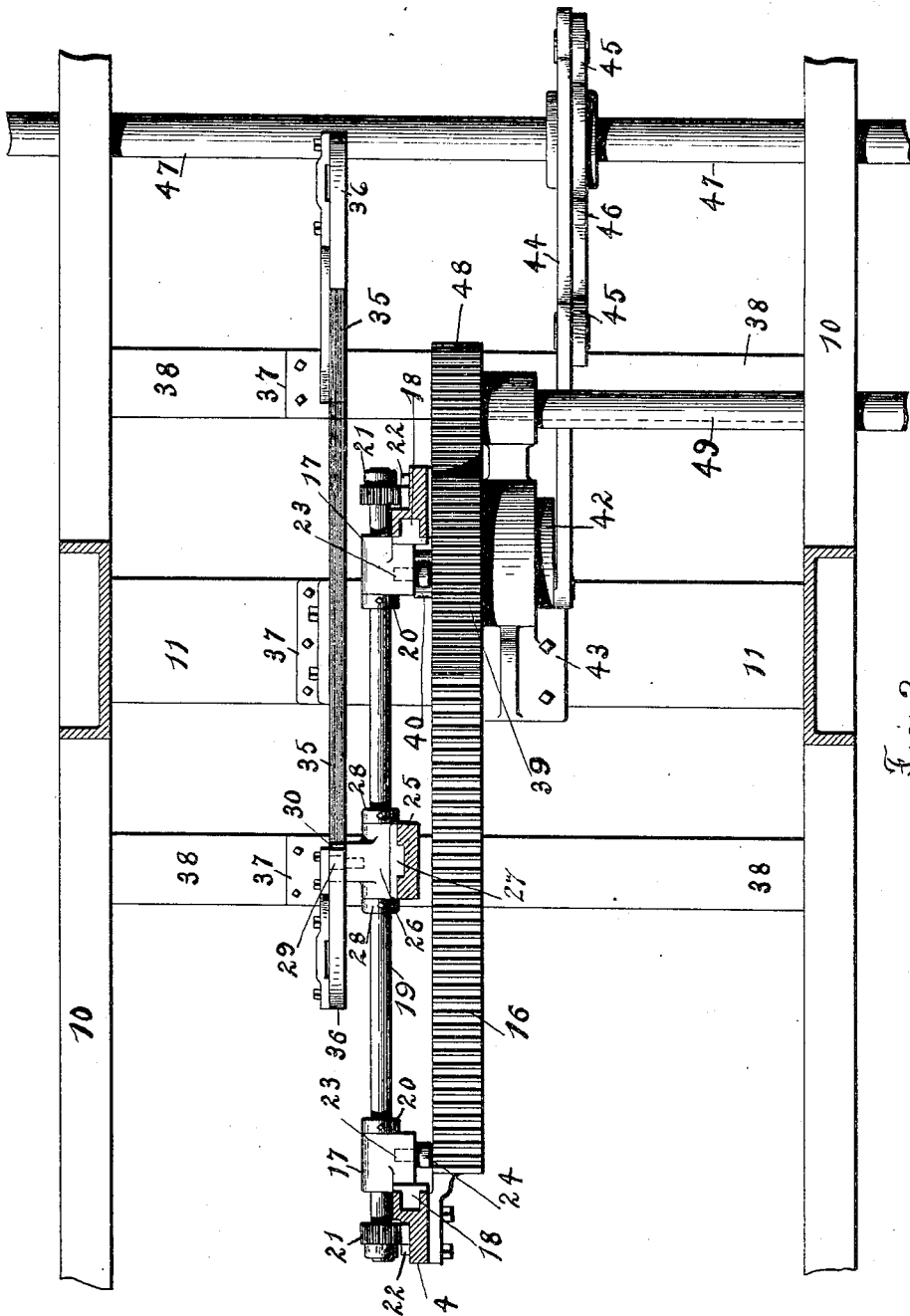

Referring to the accompanying two sheets of drawings, forming part of this specification, Figure 1 is a sectional elevation of the improved mechanical movement. Fig. 2 is a sectional plan view, and Fig. 3 is a detail view on an enlarged scale.

There are many mechanisms now well known for imparting to a printing-press bed or moving member its main reciprocation; and my invention consists in combining with such mechanism a peculiar reversing mechanism. This reversing mechanism consists in movable bearings carried by the moving member, stationary curved guideways controlling the movement of the bearings during the reversing period, and a revolving crank which engages one of the bearings to impart the reversing movement. The bearings are preferably connected together by a squaring-shaft, so that they will all have the same vertical movement. The revolving crank may also constitute the main driving-gear of the machine.

Referring to the drawings and in detail, 10 10 represent the usual side frames, which may be connected together by a box-girder 11.

12 represents the reciprocating bed, which is fitted to reciprocate on the framework of the machine in any of the manners common in printing-presses.

The position of the impression-cylinder of the printing-press is indicated in dotted lines, 13.

Depending from each end of the bed are brackets 14 14. Secured between these brackets is a top rack 15 and a lower rack 16. 17 17 designate two bearings or sliders, which have projections or feet 18 18 fitted to ways in the brackets 14 14, so that the bearings are capable of vertical movement on said brackets or of a movement perpendicular to the line of movement of the bed. Suitable stops, as 180, are provided in the brackets 14, so as to limit the lowest position of the bearings. Journaled in said bearings or sliders 17 17 is a shaft 19, which is held in place by means of suitable collars 20 20. On the ends of this shaft are secured pinions 21 21, which mesh with vertically-arranged racks 22 22, secured to the brackets 14. Secured to each bearing or slider 17 is a wrist-pin 23, on each of which is preferably arranged a roller 24. Also arranged between the upper and lower parts carried by the bed is a bracket 25. Bearing on this bracket is a slider 26, which has a foot 27 fitted to bear on the bracket 25. The foot 27 may either be fitted to or rest on the the said bracket 25. The bracket 25 is provided, so as to steady the slider 26 as the wrist-pin carried thereby runs around the guideway, as hereinafter described. The shaft 19 is journaled in this slider 26 and held in place by means of suitable collars 28. This slider carries a wrist-pin 29, upon which preferably is arranged a roller 30.

35 designates a suitable guiding-piece which has straight sides and semicircular ends. Arranged concentrically with each end is a semicircular shoe 36, by this construction a stationary curved guideway being provided at each end. The guide and shoes are held in position by means of suitable brackets 37, which are secured to the main girder 11 and also to auxiliary girders 38 38. The wrist-pin 29 and its roller rest on the guide 35.

39 designates the main driving-gear of the machine, which is arranged between the racks 15 and 16. Secured on the side of this main driving-gear is a socket-piece 40, which is so set that the same can engage either wrist-pin 23 and roller 24. The shaft 41 of the main driving-gear is eccentrically journaled in a bushing 42, which bushing is journaled in a bearing 43, bolted to the main girder 11.

The bushing above referred to has an extending arm, to which is connected a yoke 44, which has suitable studs, on which are mounted rollers 45, which engage a cam 46, mounted on the shaft 47.

Meshing with the main driving-gear 39 is a pinion 48, which is mounted on a shaft 49, which may constitute the main driving-shaft of the machine. This main driving-shaft and its connections constitute a main driving mechanism, operating substantially as shown and described in my prior patent, No. 570,597, granted November 3, 1896. The gear 39 is so arranged that the same will be raised and lowered to alternately engage the racks 15 and 16 to impart the main movement of the bed.

The operation of the reversing mechanism is as follows: Just as the main driving-gear 39 leaves either the rack 15 or 16 the socket 40 will engage one of the wrist-pins 23, and as this takes place the wrist-pin 29 and its roller will just enter one of the curved guideways, as shown in the drawings. Then the next half-revolution of the gear 39 will impart a crank-reverse to the bed, and the wrist-pin 29, running around the curved guide-roll acting in opposition to the socket 40, will keep the wrist-pin 23 accurately in the socket 40. This crank-reverse will of course bring the bed from full speed to a state of rest and start the same in the reverse direction from its state of rest to full speed. As this operation takes place both bearings 17 and the intermeate bearing 26 will be lowered or raised, as the case may be. As the bed has its main movement imparted thereto the socket 40 will be out of engagement with the wrist-pin 23, and the wrist-pin 29 and its roller 30 will run on the top or bottom of the guide 35. The strain of the reverse is taken on the shaft 19. As shown in Fig. 1, the bed has just completed its full speed movement to the left and is just starting on the slowing-down part of the reversing movement in that direction. The wrist-pin 29 and its roller 30 are just engaging the left-hand curved guideway, and during a quarter-revolution of the main driving-gear from the position shown in Fig. 1 said crank-pin will gradually bring the bed to a state of rest, this movement being accomplished by said crank-pin running down said guideway and partly by the socket 40 engaging the right-hand crank-pin 23 and its roller 24. In the next quarter-revolution of the main driving-gear the bed will be gradually started on its movement to the right by the socket 40 pushing down on said crank-pin 23 and its roller 24 and being assisted by the movement of the crank-pin 29 and its roller 30 in the lower part of the left-hand curved guideway. This quarter-rotation of the main driving-gear will start the bed at a gradually-increasing speed from zero up to full speed on its movement to the right. The strain of the wrist-pin 29 is imparted to the slider 26. If the slider is fitted to the bracket 25, the strain of this wrist-pin will come on said bracket, or if the slider 26 is left free on the face of the bracket 25 the strain will be imparted to the shaft 19 and taken by the collars 20 and imparted to the sliding bearings 17 and by them to the brackets 14, which form part of the bed or moving member. The strains imparted to the wrist-pin 23 will also be taken on the brackets 14.

As shown in the drawings, the device is designed to have what is known as a "three-revolution" main driving-gear—that is, the main driving-gear makes a complete revolution to impart the forward movement to the bed, a complete revolution to impart the backward movement to the bed, and a half-revolution for each reversal. By changing the length of the racks and other parts of the machine this arrangement can be lengthened or shortened, as is well understood by the printing-press designer.

The center of the socket 40 is set on the pitch circumference of the gear 39, so that the complete stroke of the bed will be a pitch circumference of said gear 39 plus a pitch diameter thereof.

It is evident, of course, that the three bearings 17 17 and 26 could be joined together by suitable framework, connecting the same together additionally to the connection afforded by the shaft 19, so as to rise and fall together on the moving member; but the construction shown is the preferred one.

It will be seen that the socket 40 in the operation is mounted on a revolving crank—that is, the main driving-gear 39 performs this function—although, of course, the socket 40 could be mounted on an independent crank-arm.

The construction shown is that preferred, because it tends to simplicity.

Having thus fully described my invention, what I claim, and desire to secure by Letters Patent, is—

1. The combination of the moving member, a mechanism for giving the same its main reciprocation, and a reversing mechanism comprising movable bearings mounted on the bed so as to have a right-line movement thereon perpendicular to the movement of the bed, a stationary curved guideway controlling the movement of the bearings during the reversing period, and a revolving crank engaging one of the bearings to impart the reversing movement.

2. The combination of the moving member, a mechanism for giving the same its main reciprocation, and a reversing mechanism comprising movable bearings mounted on the bed so as to have a right-line movement thereon perpendicular to the line of reciprocation, stationary separated curved guideways controlling the movement of the bearings during the reversing periods, and a revolving crank for engaging one of the bearings to impart the reversing movement.

3. The combination of the moving member, mechanism for giving the same its main reciprocation, and a reversing mechanism comprising three bearings carried by the moving member, curved guideways for controlling the movement of the bearings during the reversing period, and a revolving crank for engaging one of the bearings to impart the reversing movement.

4. The combination of the moving member, a mechanism for giving the same its main reciprocation, and a reversing mechanism comprising three bearings fitted to move together on the moving member, curved guideways engaging the middle bearing and controlling the movement of the bearings during the reversing period, and a revolving crank for engaging the end bearings to impart the reversing movement.

5. The combination of the moving member, a mechanism for giving the same its main reciprocation, and a reversing mechanism comprising three bearings fitted on the bed, a squaring-shaft connecting said bearings, curved guideways controlling the position of the middle bearing during the reversing movement, and a revolving crank for engaging the end bearings to impart the reversing movement.

6. The combination of the moving member, a mechanism for giving the same its main reciprocation, and a reversing mechanism comprising three movable bearings fitted on the moving member, a guide 35, and end shoes for controlling the position of the middle bearing, and a revolving crank for engaging the end bearings to impart the reversing movement.

7. The combination of the moving member, a mechanism for giving the same its main reciprocation, and a reversing mechanism comprising movable bearings fitted to slide on the moving member on right lines perpendicular to the movement thereof, each bearing carrying a wrist-pin, a stationary curved guideway controlling the movement of the bearings during the reversing period, and a revolving crank carrying a socket for engaging one of the wrist-pins to impart the reversing movement.

8. The combination of the moving member, a mechanism for giving the same its main reciprocation, and a reversing mechanism comprising movable bearings fitted to slide on the moving member on right lines perpendicular to the movement thereof, each of said bearings carrying a wrist-pin, curved guideways controlling the movement of the bearings during the reversing period, and a revolving crank carrying a socket for engaging one of the wrist-pins to impart the reversing movement.

9. The combination of the moving member, a mechanism for giving the same its main reciprocation, and a reversing mechanism comprising three movable bearings carried by the bed, each bearing carrying a wrist-pin, a stationary, curved guideway which the wrist-pin on the intermediate bearing engages to control the movement of the bearings during the reversing period, and a revolving crank carrying a socket for engaging one of the wrist-pins to impart the reversing movement.

10. The combination of the moving member, a mechanism for imparting the main reciprocation thereto, and a reversing mechanism comprising three bearings carried by the moving member, a squaring-shaft connecting the three bearings, each bearing carrying a wrist-pin, a guideway 35 and end shoes 36 which the wrist-pin on the intermediate guideway engages, and a revolving crank carrying a socket adapted to engage the wrist-pins on the end bearings.

11. The combination of the moving member, a main driving mechanism for imparting the main reciprocation thereto, end brackets depending from the moving member, an intermediate bracket carried by the moving member, three bearings fitted to said brackets, a squaring-shaft connecting said bearings, a guide 35 and end shoes 36 controlling the position of the intermediate bearing, and the revolving crank engaging one of the end brackets to impart the reversing movement.

12. The combination of the reciprocating bed, top and bottom racks carried thereby, the main driving-gear alternately engaging said racks to impart the main driving movement to the bed, bearings fitted to slide on said bed on right lines perpendicular to the movement thereof, a guide and end shoes controlling the position of said bearings, and a socket carried by the main driving-gear for engaging said bearings to impart the reversing movement.

In testimony whereof I have hereunto set my hand in the presence of two subscribing witnesses.

WINFIELD S. HUSON.

Witnesses:
 HENRY W. COZZENS, Jr.,
 LOUISE PECKHAM.